United States Patent [19]

Carter et al.

[11] 4,369,300

[45] Jan. 18, 1983

[54] ACRYLATED URETHANE SILICONE COMPOSITIONS

[75] Inventors: Richard G. Carter, Brookfield, Conn.; Walter P. Miller; Stuart L. Watson, Jr., both of South Charleston, W. Va.

[73] Assignee: Union Carbide Corporation, Danbury, Conn.

[21] Appl. No.: 337,481

[22] Filed: Jan. 8, 1982

Related U.S. Application Data

[63] Continuation-in-part of Ser. No. 260,921, May 6, 1981, abandoned, which is a continuation of Ser. No. 97,447, Nov. 26, 1979, abandoned.

[51] Int. Cl.³ .............................................. C08G 77/04
[52] U.S. Cl. ................................... 528/28; 204/159.13; 204/159.22; 204/159.23; 528/12; 528/20; 528/21; 528/18; 528/32; 528/75; 556/414
[58] Field of Search ................. 528/75, 28, 12, 20, 528/21, 32, 18; 556/414; 204/159.13, 159.22, 159.23

[56] References Cited

U.S. PATENT DOCUMENTS

| | | | |
|---|---|---|---|
| Re. 29,131 | 2/1977 | Smith et al. | 204/159.14 |
| 3,650,813 | 3/1972 | Nordstrom | 204/159.13 |
| 3,878,263 | 4/1975 | Martin | 528/26 |
| 4,130,708 | 12/1978 | Friedlander et al. | 528/28 |
| 4,131,602 | 12/1978 | Hodakowski et al. | 528/75 |

FOREIGN PATENT DOCUMENTS 2233514 1/1973 Fed. Rep. of Germany .
1433461 4/1976 United Kingdom .

*Primary Examiner*—Melvyn I. Marquis
*Attorney, Agent, or Firm*—Francis M. Fazio

[57] ABSTRACT

Acrylated urethane silicone compositions are formed from the reaction of a silicone carbinol, a polyisocyanate and a hydroxy-functional acrylate. These compositions are useful as components of improved radiation-curable coating compositions.

14 Claims, No Drawings

ACRYLATED URETHANE SILICONE COMPOSITIONS

CROSS-REFERENCE TO RELATED APPLICATIONS

This application is a continuation-in-part of our prior U.S. application Ser. No. 260,921, filed May 6, 1981, now abandoned which is a continuation of our prior U.S. application Ser. No. 097,447, filed Nov. 26, 1979, now abandoned.

BACKGROUND OF THE INVENTION

Coatings play a useful role in the manufacture of a great many articles which find wide use in nearly all facets of contemporary life. Until recently, nearly all coatings were applied with the employment of a hydrocarbon based solvent which evaporated leaving a dried coating on the article which was to be coated. This system met with increasing disfavor as the price of organic solvent increased and as the deleterious environmental effects of the evaporated solvent became better understood. Systems aimed at solvent recovery to reduce pollution and conserve solvent have generally proven to be expensive and energy intensive. In response, those skilled in the art have devised a class of coatings termed radiation-curable coatings in which, upon exposure to radiation, virtually all of the liquid portion of the coating is converted to cured coating resulting in little solvent emission.

Unfortunately many of the radiation-curable coatings which have been heretofore manufactured are highly viscous and difficult to apply to the substrate requiring dilution of the coating material with volatile solvents. A radiation-curable coating which is of such low viscosity so as to avoid the use of diluents would be of great advantage.

SUMMARY OF THE INVENTION

It has now been found that compositions formed from the reaction of a silicone carbinol, a polyisocyanate and a hydroxy-functional acrylate can be incorporated in radiation-curable coatings and that the resulting coatings are significantly less viscous than the heretofore available coatings.

DESCRIPTION OF THE INVENTION

The acrylated urethane silicone compositions of this invention are the reaction products of a silicone having at least four reactive hydroxyl groups in the molecule (a silicone carbinol), an organic polyisocyanate and a hydroxyalkyl acrylyl compound; all as hereinafter defined.

The silicone carbinols useful are those having a plurality of hydroxyl groups in the molecule. Particularly useful are the silicone carbinols of the grafted copoly type of the formula;

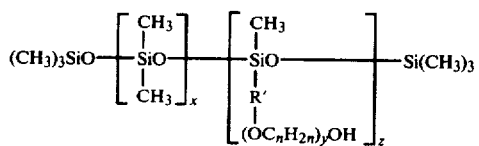

wherein R' is an alkylene group having from 1 to 16 carbon atoms; n is an integer having a value of 2 or 3; x has an average value of from 1 to 1000; y has an average value of from 0 to 15; and z has an average value of from 4 to 6, preferably 5 to 6. The silicon carbinols having a higher hydroxyl functionality, i.e. a higher value of z, are preferred since an acrylated urethane silicon having better film properties results when silicones of a higher hydroxyl functionality are used.

The organic polyisocyantes are known compounds and can be represented by the general formula $Q(NCO)_m$ wherein m has a value of from 2 to 5 and Q is the residual organic portion of the molecule to which the isocyanato groups are attached. Among those suitable for use in this invention one can mention 3,5,5-trimethyl-1-isocyanato-3-isocyanato-methylcyclohexane, di(2-isocyanatoethyl)-bicyclo [2,2,1]-hept-5-ene-2,3-dicarboxylate, 2,4-tolylene diisocyanate, 2,6-tolylene diisocyanate, 4,4'-diphenylmethane diisocyanate, dianisdine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate,4,4'-diisocyanate diphenyl ether, 2,4,6-triisocyanato toluene, 4,4',4''-triisocyanate triphenyl methane, diphenylene-4,4-diisocyanate, the polymethylene poly-phenylisocyanates, as well as any of the other organic isocyanates known to the average skilled chemist.

The hydroxyalkyl acrylyl compounds suitable for use in producing the acrylated urethane silicones are those of the formula

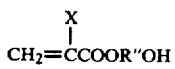

wherein X is hydrogen or methyl and R'' is a linear or branched divalent alkylene having from 2 to about 5 carbon atoms. Illustrative thereof one can mention hydroxyethyl acrylate, hydroxypropyl acrylate, hydroxypentyl acrylate and the corresponding methacrylates.

In producing the acrylated urethane silicones one initially produces a prepolymer containing free isocyanato groups and then reacts the free isocyanato groups with a reactant containing a reactive hydrogen atom. Thus, in one embodiment of the reaction, the silicone carbinol is reacted with a sufficient excess of organic polyisocyanate to permit reaction of all of the hydroxyl groups with isocyanato groups but still have unreacted at least one free isocyanato equivalent per mole of prepolymer produced, thereby producing an isocyanato terminated prepolymer. Thereafter this prepolymer is reacted with the hydroxyalkyl acrylyl compound. In a second embodiment of the reaction the prepolymer is produced by initially reacting the organic polyisocyanate with the hydroxyalkyl acrylyl compound and then reacting the prepolymer with the silicone carbinol.

In either mode of operation the reaction of the silicone carbinol, polyisocyanate and acrylate to form the compositions of this invention can be carried out at a temperature of from 0° C. to 125° C. The preferred temperature is ambient, i.e. about 20°-30° C.

The reaction can be carried out at subatmospheric, atmospheric or superatmospheric pressure; the preferred pressure is atmospheric.

The reaction time will vary according to the size of the batch, the temperature and pressure and the nature of the particular silicone carbinol, polyisocyanate and hydroxy-functional acrylate reactants being employed.

The reaction will proceed uncatalyzed, but a catalyst can be employed to expedite it. Such catalysts are well known in the art and include dibutyl tin dilaurate, stannous octoate, dioctyl tin diacetate, morpholine, triethylene diamine as well as any other suitable urethane catalyst recognized in the art. The catalyst, if present, can be in a concentration of from 0.01 to 1.0 weight percent, preferably from 0.05 to 0.2 weight percent, based on the total weight of the reaction mixture.

The acrylated urethane silicone compositions of this invention can be used as coating compositions either alone or in mixture with other reactive monomers, solvents, pigments, fillers and other additives. The coating compositions can be applied by conventional means and cured by exposure to ultraviolet light or to high energy radiation such as gamma-ray, alpha-particle, beta-particle and accelerated electrons or by heat. If ultraviolet light is employed the coating composition preferably contains a photoinitiator. Illustrative of such photoinitiators one can name α,α-di-S-butoxyacetophenone, 2,2-diethoxyacetophenone, 2,2-dimethoxy-2-phenylacetophenone, benzophenone, p-methoxybenzophenone, acetophenone, m-chloroacetophenone, propiophenone, xanthone, benzion, benzil, benzaldehyde, naphthoquinone, anthraquinone and the like. The photoinitiator may be used singly or in mixtures and is present in a concentration of from 0 to 10 weight percent preferably from 0.5 to 5 weight percent based on the weight of the acrylated urethane silicone present.

When heat curing is employed there can be employed free radical initiators in a concentration of from about 0.1 to 10 weight percent, preferably from 0.5 to 5 weight percent based on the weight of the acrylated urethane silicone present. Illustrative of such free radical initiators one can name di-t-butyl peroxide, dicumyl peroxide, t-butyl hydroperoxide, t-butyl peracetate, peracetic acid, perbenzoic acid, benzoyl peroxide, dichlorobenzoyl peroxide, azobis(isobutyrontrile), dimethyl azobis(isobutyrate) and the like.

The coatings can be applied to any acceptable substrate such as wood, metal, glass, fabric, paper, fiber, plastic that is in any form, e.g. sheet, coil, molded, film, panel, tube, etc., by conventional means including spray curtain, dip pad, roll-coating and brushing procedures.

In a typical embodiment isophorone diisocyanate and dibutyl tin dilaurate as catalyst are charged to a flask, stirred and heated, while a silicone carbinol is added dropwise. After completion of this reaction, 2-hydroxyethyl acrylate is added dropwise and the mixture is stirred and heated for an additional period to complete the reaction. The acrylated urethane silicone produced is stabilized with hydroquinone monomethyl ether. A coating is produced by blending with 2-(N-methyl-carbamoyl) oxyethyl acrylate and α,α-di-S-butoxyacetophenone as photoinitiator. When applied to release paper and irradiated with ultraviolet light, the liquid cured to a polymerized film.

It was completely unexpected and unobvious to find that the reaction of a silicone carbinol having a high hydroxy functionality, a polyisocyanate and a hydroxyfunctional acrylate would produce an acrylated urethane silicone which has a low viscosity so that it can be easily coated on substrates without the use of diluents, and which can be employed in a radiation curable composition. Generally, compounds containing a carbinol of high hydroxyl functionality also have a high viscosity and require a solvent to lower the viscosity for use in coating compositions. The invention provides for a composition with good film properties as a result of the high functionality and yet with low viscosity, allowing for diluent free coating compositions. Therefore, an improved and preferred radiation-curable coating is one that is diluent-free.

The acrylated urethane silicones are especially useful in the formulation of low viscosity varnishes for application over conventional ink prints while the ink is still in the uncured state, with subsequent curing of the varnish by exposure to radiation. The unique properties of the acrylates urethane silicones such as a low viscosity/molecular weight ratio good flowout performance, good wetting of the ink surface combined with minimal miscibility with the ink make them particularly good choices for this application in view of the fact that the commonly used organic acrylate materials, when used in this application yield varnishes which do not provide the desired high level of gloss combined with good film properties, such as scratch resistance, flexibility and adhesion, after the ink has cured to a solid state by the process of vehicle penetration into the substrate and oxidation of the contained drying oils.

The following examples serve to further illustrate the invention.

EXAMPLE 1

There were charged to a 500 ml four-neck round-bottom flask, equipped with a mechanical stirrer, cooling water bath and dropping funnel, 11.1 grams of isophorone diisocyanate and 5 drops of dibutyl tin dilaurate as catalyst. While the temperature was maintained at about 20° C. to 25° C. with the cooling water bath, 7 grams of 2-hydroxyethyl acrylate was added dropwise with stirring. When the addition was complete the mixture was stirred at room temperature for about 16 hours to complete formation of the isocyanato terminated prepolymer. Thereafter 50 grams of silicone polycarbinol having a hydroxyl number of 200 mg.KOH/g, a specific gravity of 1.06 at 25° C. and a viscosity of 350 centistokes at 25° C. was added dropwise and the mixture was stirred at ambient temperature for about 24 hours. The silicone polycarbinol had the chemical formula

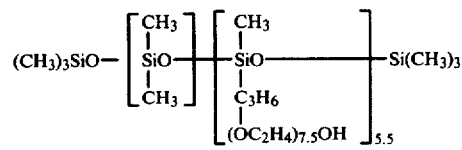

Thereafter 99 parts of this acrylated urethane silicone was mixed with 1 part of α,α-di-S-butoxyacetophenone as photoinitiator. The resulting mixture was coated on release paper and then irradiated for 2.88 seconds under a nitrogen atmosphere using ultraviolet radiation at a wavelength of about 3500 angstrom units. The liquid cured to a dry film, and the film was removed from the release paper.

The film was placed in a constant temperature/humidity chamber overnight. The next day a 0.25 inch wide strip was cut and placed in a 1.0 inch gauge length crosshead of a stress strain testing machine. The film strip was stretched to breakage and the force at failure was used together with the width and thickness to calculate the force per unit area at failure. The ultimate elongation was calculated using the formula $$\text{Ultimate Elongation \%} = \left(\frac{L}{L_o} - 1\right) 100$$

where L is the length at failure and $L_o$ is the original gauge length. The film was found to have a tensile strength of 64 psi and an ultimate elongation of 19 percent.

EXAMPLE 2

To 49 parts of the acrylated urethane silicone prepared in Example 1 there was added 1 part of α, α-di-S-butoxyacetophenone as photoinitiator, resulting in a clear varnish having a viscosity at 25° C. of about 2000 cps. A sheet of coated offset paper was prepared by coating an ink film using a hand proofer with a large charge of black ink on its surface so as to obtain two complete roller revolutions down the center of the sheet from top to bottom then immediately applying the varnish over the ink film with another hand proofer equipped with a 180 line/inch quadragravure engraved metering roll. The printed and coated paper thus formed was then immediately passed through an ultraviolet curing unit delivering a flux of 160 watts per square foot, under a nitrogen atmosphere, over a path length of 2 feet. The conveyor belt speed was set at 275 ft./min giving an exposure time of about 0.44 second. Cure of the varnish was judged to be complete by virtue of its resistance of fingernail scratch. The properties of the varnish over the ink film were evaluated 20 hours after curing. Flow-out and wetting were judged to be good using visual comparative methods. Gloss level measured by a 60° C. gloss meter was 72 percent.

EXAMPLE 3

There were charged to the apparatus described in Example 1, 8.7 grams of an 80/20 mixture of 2,4-and 2,6-isomers of toluene diisocyanate and 5 drops of dibutyl tin dilaurate as catalyst. While the temperature was maintained at about ambient with the cooling water bath, 7 grams of 2-hydroxyethyl acrylate was added dropwise with stirring. When the addition was complete the mixture was stirred at room temperature for about 3 hours to complete the formation of the isocyanato terminated prepolymer. Thereafter 50 grams of the silicone polycarbinol described in Example 1 was added dropwise. After this addition the mixture was stirred at ambient temperature for about 16 hours to form the acrylated urethane silicone composition; after which 0.01 grams of hydroquinone monomethyl ether was added as polymerization inhibitor. Thereafter 73 parts of the acrylated urethane silicone was formulated with 25 parts of the diacrylate derivative of the 4 mole ethoxylate of 2,2-dimethyl-3-hydroxypropyl-2,2-dimethyl-3-hydroxypropionate and 2 parts of α,α-di-S-butoxyacetophenone as photoinitiator. This formulation was applied to coated offset paper and cured using the procedure described in Example 2. The resultant dry film was glossy and free of surface tack.

EXAMPLE 4

There were charged to the apparatus described in Example 1, 35.5 grams of isophorone diisocyanate and 5 drops of dibutyl tin dilaurate as catalyst. While the temperature was maintained at about ambient with the cooling water bath, 20.0 grams of 2-hydroxyethyl acrylate was added dropwise with stirring. When the addition was complete the mixture was stirred at room temperature for about 4 hours to complete formation of the isocyanato terminated prepolymer. Thereafter 50 grams of silicone polycarbinol described in Example 1 was added dropwise. After this addition the mixture was stirred at ambient temperature for about 16 hours to form the acrylated urethane silicone composition. Thereafter 73 parts of this acrylated urethane silicone was formulated with 25 parts of trimethylolpropane triacrylate and 2 parts of α,α-di-S-butoxyacetophenone as photoinitiator. The formulation had a viscosity of 1010 cps at 25° C. The mixture was applied as a varnish over uncured ink and cured following the procedure described in Example 3 resulting in a tack-free surface. After the varnish was cured, the sheet was aged for about 20 hours and evaluated using the tests used in Example 2. The results were as follows
60° gloss—82%
flow-out—fair to good
wetting—good

EXAMPLE 5

There were charged to the apparatus described in Example 1, 10.5 grams of a mixture of 2,2,4- and 2,4,4-isomers of trimethyl hexamethylene diisocyanate and 5 drops of dibutyl tin dilaurate as catalyst. While the temperature was maintained at about ambient with the cooling water bath, 7 grams of 2-hydroxyethyl acrylate was added dropwise with stirring. When the addition was complete the mixture was stirred at room temperature for about 4 hours to form the isocyanato terminated prepolymer. Thereafter 50 grams of the silicone polycarbinol described in Example 1 was added dropwise. After this addition the mixture was stirred at ambient temperature for about 16 hours to complete production of the acrylated urethane silicone. Thereafter 73 parts of this acrylated urethane silicone was formulated with 25 parts of pentaerythritol acrylate and 2 parts of α,α-di-S-butoxyacetophenone as photoinitiator. The formulation had a viscosity of 2300 cps at 25° C. It was then applied over uncured ink and cured following the procedure described in Example 6 resulting in a clear tack-free film. After the varnish was cured, the sheet was aged for 20 hours and evaluated using the tests in Example 2. The results were as follows:
60° gloss—76%
flow-out—fair
wetting—good

EXAMPLE 6

Four varnishes were prepared using the procedure described in Example 2. For comparative purposes, two other varnishes, representing the heretofore state of the art were produced and evaluated using the same procedures. The compositions of each varnish and the results of the evaluation are shown in Table I.

TABLE I

| | Varnish (parts by weight) | | | | | |
|---|---|---|---|---|---|---|
| | A | B | C | D | E | F |
| Acrylated Urethane Silicone of Example 1 | 39 | 50 | 42 | 17 | — | — |
| Polyether Urethane Oligomer | — | — | — | 12 | 29 | — |

7

TABLE I-continued

| | Varnish (parts by weight) | | | | | |
|---|---|---|---|---|---|---|
| | A | B | C | D | E | F |
| Caprolactone Polyol Urethane Oligomer Adduct of 1 mole Isophorone Diisocyanate and 2 moles 2-hydroxyethyl acrylate | — | — | — | — | — | 8 |
| Trimethylolpropane triacrylate | 61 | — | 53 | 60 | 66 | 44 |
| Phenoxyethyl acrylate | — | — | 5 | 5 | 5 | 12 |
| α,α-di-S—butoxyacetophenone | 2 | 2 | 2 | 2 | 2 | 2 |
| Compound A | 1 | 1 | 1 | 1 | 1 | 1 |
| Compound B | — | 50 | — | — | — | — |
| 60° gloss | 74 | 78 | 72 | 75 | 67 | 68 |
| Flow-out | Good | Good | Fair to Good | Good | Fair to Good | Good |
| Resistance to cracking when folded | Good | Exc. | Exc. | Good | Fair | Fair |

Compound A—

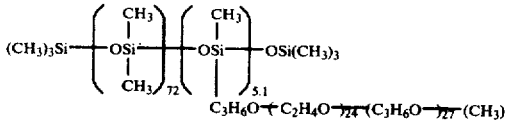

Compound B—The diacrylate derivative of the 4 mole ethoxylate of 2,2-dimethyl-3-hydroxypropyl-2,2-dimethyl-3-hydroxypropionate This example demonstrates the superior properties of varnishes employing the acrylated urethane silicones of this invention particularly the resistance to cracking over those of the heretofore present state of the art.

What is claimed is:

1. Acrylated urethane silicone reaction products of the reaction of:

(A) a silicone carbinol of the formula

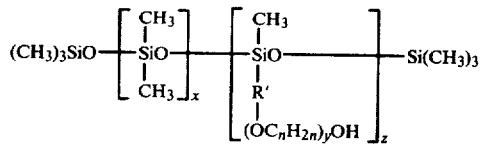

wherein R' is an alkylene group having from 1 to 16 carbon atoms; n is an integer having a value of 2 or 3; x has an average value of from 1 to 1000; y has an average value of from 0 to 15; and z has an average value of from 4 to 6;

(B) an organic polyisocyanate of the formula $Q(NCO)_m$ wherein m has a value of from 2 to 5 and Q can be linear or branched alkylene having from 1 to 10 carbon atoms; arylene, alkarylene or aralkylene having from 6 to 12 carbon atoms; cycloalkylene having from 5 to 10 carbon atoms; or bicycloalkylene having from 7 to 15 carbon atoms; and

8

(C) a hydroxyalkyl acrylyl compound of the formula

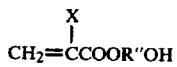
   $$CH_2=CCOOR''OH$$

wherein X is hydrogen or methyl and R'' is a linear or branched divalent alkylene having from 2 to about 5 carbon atoms.

2. Acrylated urethane silicone reaction products as claimed in claim 1 wherein x has an average value of 5 to 6.

3. Acrylated urethane silicone reaction products as claimed in claim 1 wherein said silicone carbinol has the formula

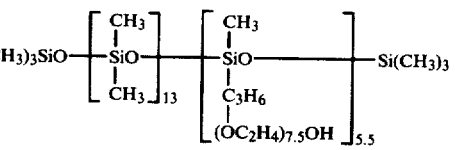

4. Acrylated urethane silicone reaction products as claimed in claim 1 wherein said organic polyisocyanate is isophorone diisocyanate.

5. Acrylated urethane silicone reaction products as claimed in claim 1 wherein said organic polyisocyanate is bis(4-isocyanatocyclohexyl)methane.

6. Acrylated urethane silicone reaction products as claimed in claim 1 wherein said organic polyisocyanate is toluene diisocyanate.

7. Acrylated urethane silicone reaction products as claimed in claim 1 wherein said organic polyisocyanate is trimethyl hexamethylene diisocyanate.

8. Acrylated urethane silicone reaction products as claimed in claim 1 wherein said hydroxyalkyl acrylyl compound is 2-hydroxyethyl acrylate.

9. In a radiation-curable coating the improvement therein of formulating the radiation curable coating with acrylated urethane silicone reaction products of the reaction of:

(A) A silicone carbinol of the formula;

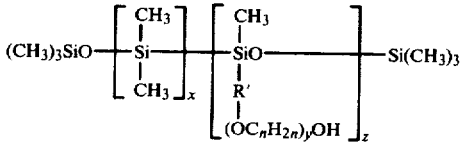

wherein R' is an alkylene group having from 1 to 16 carbon atoms; n is a integer having a value of 2 or 3; x has a value of from 1 to 1000, y has a value of from 0 to 15; and z has a value of from 4 to 6;

(B) an organic polyisocyanate of the formula $Q(NCO)_m$ wherein m has a value of from 2 to 5 and Q can be linear or branched alkylene having from 1 to 10 carbon atoms; arylene, alkarylene or aralkylene having from 6 to 12 carbon atoms; cycloalkylene having from 5 to 10 carbon atoms; or bicycloalkylene having from 7 to 15 carbon atoms; and (C) a hydroxyalkyl acrylyl compound of the formula

wherein X is hydrogen or methyl and R" is a linear or branched divalent alkylene having from 2 to about 5 carbon atoms.

10. An improved radiation-curable coating as claimed in claim 9 wherein x has an average value of 5 to 6.

11. An improved radiation-curable coating as claimed in claim 9 wherein said silicone carbinol has the formula

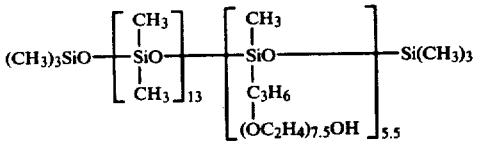

12. An improved radiation-curable coating as claimed in claim 9 wherein said organic polyisocyanate is from the group comprised of isophorone diisocyanate, bis(4-isocyanotocyclohexyl)methane, toluene diisocyanate and trimethyl hexamethylene diisocyanate.

13. An improved radiation-curable coating as claimed in claim 9 wherein said hydroxyalkyl acrylyl compound is 2-hydroxyethyl acrylate.

14. An improved radiation-curable coating as claimed in claim 9 or 10 wherein the radiation-curable coating is diluent-free.

* * * * *